United States Patent

Kagechika

[11] 4,327,976
[45] May 4, 1982

[54] LIGHT BEAM PROJECTING DEVICE FOR AUTO-FOCUSING CAMERA

[75] Inventor: Takashi Kagechika, Kounosu, Japan

[73] Assignee: Fuji Photo Optical Co., Ltd., Japan

[21] Appl. No.: 253,358

[22] Filed: Apr. 13, 1981

Related U.S. Application Data

[63] Continuation-in-part of Ser. No. 61,365, Jul. 27, 1979.

[30] Foreign Application Priority Data

Jul. 19, 1978 [JP] Japan .................................. 53/87941
Jul. 19, 1979 [DE] Fed. Rep. of Germany ....... 2929268

[51] Int. Cl.$^3$ ............................................... G03B 7/08
[52] U.S. Cl. ....................................... 354/25; 354/195
[58] Field of Search ................. 354/25 R, 25 A, 25 P, 354/195, 199, 200, 201, 126, 127, 128, 165; 250/201, 204

[56] References Cited

U.S. PATENT DOCUMENTS

| | | | |
|---|---|---|---|
| 2,642,790 | 6/1953 | Scholkemeier | 354/165 |
| 3,820,129 | 6/1974 | Hosoe et al. | 354/25 |
| 4,067,030 | 1/1978 | Kuramoto et al. | 354/165 |
| 4,123,650 | 10/1978 | Hosoe et al. | 354/25 |

*Primary Examiner*—Russell E. Adams

[57] ABSTRACT

In an auto-focusing camera, a light beam projecting device is provided for projecting a light spot on the object to be photographed. The light spot is projected on the object to be photographed in response to depression of the shutter release button or actuation of the automatic focus adjusting device incorporated in the camera.

5 Claims, 8 Drawing Figures

LIGHT BEAM PROJECTING DEVICE FOR AUTO-FOCUSING CAMERA

This application is a continuation-in-part of application of U.S. Ser. No. 61,365, filed July 27, 1979.

BACKGROUND OF THE INVENTION

1. Field of the Invention

This invention relates to a light beam projecting device for an auto-focusing camera, and more particularly to a device for projecting a light spot on an object to be photographed so that the auto-focusing device incorporated in the camera may be able to conduct the automatic focus adjustment with the information from the object having sufficient brightness at least at a part thereof to which the focus adjustment should be made.

2. Description of the Prior Art

An automatic focus adjustment has been known in the art. Among various types of the auto-focusing device for a photographic camera, it is advantageous from the viewpoint of economy and compactness to utilize a photoelectric conversion element to receive information from the object to be photographed. In the electrical type of auto-focusing device as above, the output of the photo-electric conversion element or a photodetector is processed through an electric signal processing circuits. This is advantageous in that the structure is not mechanically complicated and accordingly is easy to manufacture and in that the device is able to have high accuracy and compactness in size.

On the other hand, however, the auto-focusing device like this has a defect in that the automatic focus adjustment cannot be conducted when the object to be photographed has insufficient brightness or contrast.

SUMMARY OF THE INVENTION

The primary object of this invention is to provide a device for illuminating a part of the object to be photographed by projecting a light beam onto the object.

A more specific object of the present invention is to provide a device for projecting a light beam onto the object to be photographed with an auto-focusing camera in which the light beam is projected thereon in response to the depression of a shutter release button or in response to the actuation of the automatic focus adjusting device.

Another object of the present invention is to provide a device for projecting a light beam onto the object to be photographed in which the consumption of the power of the camera to be used for energizing various devices in the camera in addition to the light projecting device is controlled as much as possible.

The light beam projecting device in accordance with this invention is characterized in that the light beam projecting device incorporated in the auto-focusing camera is energized to project light to the object in response to the depression of the shutter release button or the actuation of the automatic focus adjusting device.

DESCRIPTION OF THE PREFERRED EMBODIMENTS

Now the invention will be described in detail with reference to the accompanying drawings.

Figure 1:
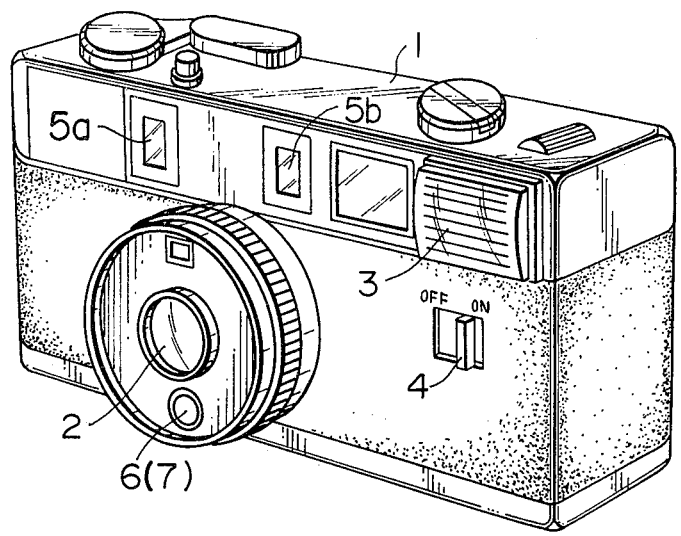
FIG. 1 is a perspective view of a camera having incorporated therein the light beam projecting device in accordance with an embodiment of the present invention.
Figure 2:
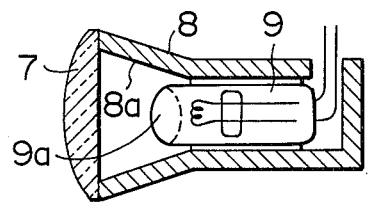
FIG. 2 is a longitudinal sectional view showing an example of the light emitting portion of this invention.
Figure 6:
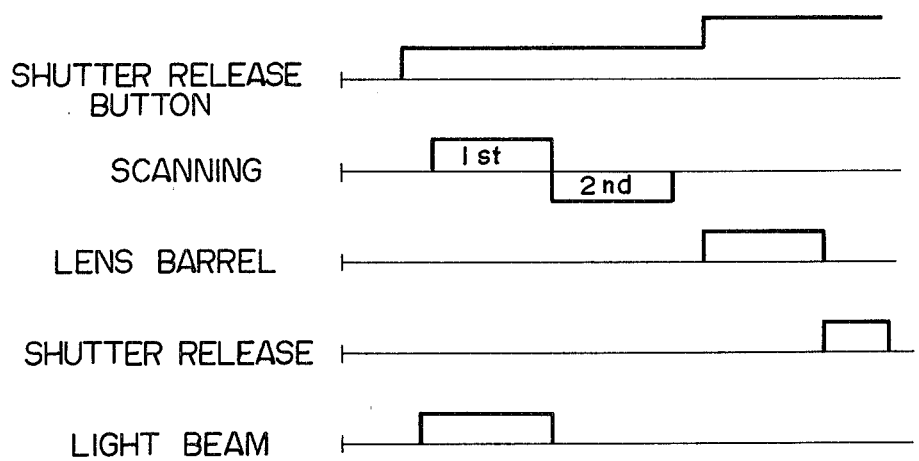
FIG. 6 is a timing chart showing the sequence of operations of various means used in this invention.

FIG. 1 shows a 35 mm type still camera incorporated with an electronic flash light tube embodying this invention in which a camera body 1 has a taking lens 2, an electronic flash light tube 3, an electronic flash light tube power switch 4, light receiving windows 5a 5b for auto-focusing, and a light beam emitting portion 6 of the light beam projecting device. The light beam projecting portion 6 consists of, as shown in FIG. 2, a lens 7 (may be a flat glass plate), a tubular body 8 having an inner surface 8a coated with a reflecting agent and a lamp 9 which has a convex lens portion 9a at the top to make the light emitted by the filament of the lamp converged into a light beam. The optical axis of the light beam is located close to and parallel to the optical axis of the taking lens 2 so that the light beam will always illuminate the object to be photographed even though the diameter of the light beam becomes very small.

Figure 3:
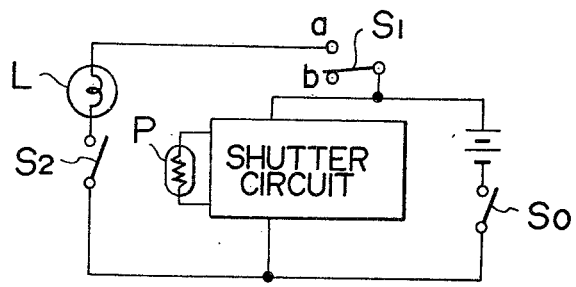
FIGS. 3 and 4 are circuit views showing examples of the control circuit employed in this invention.

FIG. 3 shows an example of a control circuit which controls the lighting operation of the lamp L of the light beam projecting device. A power switch S0 of the camera is turned ON in response to initial stage of depression of the shutter release button of the camera, and another switch S1 is a selection switch for selecting use or non-use of the light beam projecting device that is selected between terminals b and a and put into terminal a in response to turn ON of the power switch 4 of the camera in the embodiment shown in FIG. 1. The other switch S2 is an energizing switch for energizing the lamp L which may be turned ON in response to half depression of the shutter release button or immediately before operation of the automatic focus adjusting device.

With the above mentioned structure, in case that the electronic flash light tube is used when the brightness of the object is low, the photographer has only to turn ON the power switch 4 to prepare for the light beam projection, and it is secured that the light beam projecting device is operated upon turn ON of the switch S2 made in response to half depression of the shutter release button or actuation of the automatic focus adjustingg device. The above mentioned structure and operation are very much simplified in such a camera that the automatic focus adjusting device is actuated by depression of the shutter release button, and all the operations required for focus adjustment including the projection of the light beam can be made only by depressing the shutter release button. Further, by terminating the projection of the light beam onto the object in response to completion of the focus adjusting operation, the unnecessary operation of the focus adjusting device can be eliminated and consumption of the power is prevented.

Figure 4:
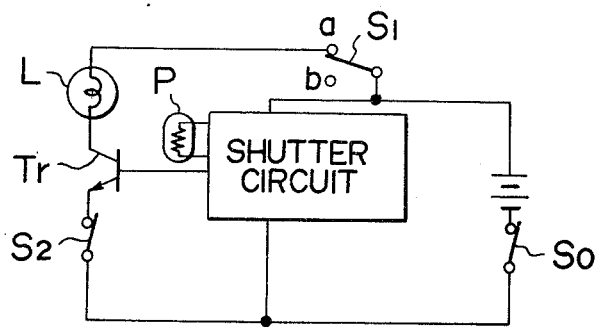

FIG. 4 shows another embodiment of the control circuit for lighting the lamp L of the light beam projecting device. In this embodiment, a transistor Tr is added to the circuit shown in FIG. 3. In FIG. 4, the elements equivalent to those shown in FIG. 3 are designated with the same reference numerals. The base of the transistor Tr is connected with the shutter circuit and is turned ON and OFF by the output of the photosensor P which measures the brightness of the object. This is for the purpose of preventing the light beam projecting device from being driven to project a light beam onto the object when the brightness of the object is so low as to need electronic flash light illumination for taking a photograph with sufficient exposure but is not so low as to need the light spot projected by the light beam projecting device. This is desirable from the viewpoint of not only saving the power but also not offending the human object.

In case of photographing a portrait, it is undesirable to project a light beam onto the model for a long time because the light beam will offend the model. Therefore, the duration of projection of the light beam is desired to be as short as possible. Further, from the viewpoint of saving the power, the duration of projection of the light beam is desired to be as short as possible. In addition, when the brightness of the object is high enough for the auto-focusing device to operate without the light spot projected on the object by the light beam projecting device, it is desirable to take a photograph without the light beam projecting device as far as possible.

In order to improve the offending effect of the light beam projected on the model, it is possible to shift the spectral distribution of the light projected on the model from the spectral sensitivity of the human eyes. For example, a color filter may be inserted between the lens 7 and the lamp 9 of the light emitting portion of the light beam projecting device as shown in FIG. 2. When a silicon photosensor is used as a photosensor in the auto-focusing device, the above effect can be obtained by inserting a red filter therebetween since the spectral sensitivity of the silicon photosensor is somewhat shifted to the long wavelength side.

Further, it is useful to project a light beam having a patterned cross section on the object so that the auto-focusing device may conduct focus adjustment by use of the pattern projected on the object. In this case, even if the object has a low contrast, the focus adjustment can be easily conducted by use of the pattern projected on the object. In order to carry out this improvement, a mask having a pattern may be provided in the light emitting portion of the light beam projecting device as shown in FIG. 2.

Figure 5:
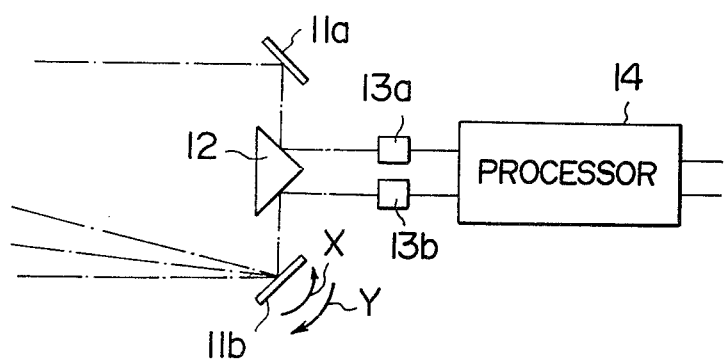
FIG. 5 is a schematic view of an example of an automatic focus adjusting device used together with the light beam projecting device of this invention.

FIG. 5 shows an example of an auto-focusing device which is adapted to the camera as shown in FIG. 1. A fixed mirror 11a reflects light from an object toward a first photoreceptor 13a via a prism 12. A movable mirror 11b rotatable in the direction of arrows X and Y reflects light from a range including the object toward a second photoreceptor 13b via the prism 12. The photoreceptors 13a and 13b each consists of a plurality of photosensors arranged in the same arrangement. When the outputs of the photosensors of one of the photoreceptors have become identical with those of the photosensors of the other photoreceptor, a focusing signal is obtained at a processor 14 connected therewith. By interrelating the rotation of the movable mirror 11b with the focusing movement of the taking lens 2, the taking lens is moved to the focusing position in accordance with the position of the movable mirror 11b.

In operation of the auto-focusing device as shown in FIG. 5, the best focus position is obtained at the processor 14 as the movable mirror 11b rotates in the direction of the arrow X. The best focus position is memorized in the processor 14. Then, as the movable mirror 11b rotates in the direction Y, a focus signal is output from the processor 14 when the movable mirror 11b has come to the memorized best focus position, which determines the amount of movement of the taking lens 2. Therefore, in the process of the backward rotation of the movable mirror 11b in the direction Y the light from the object is not necessary.

The above means that the light spot on the object is only needed while the movable mirror 11b is rotated in the first direction X. Therefore, in the example as shown in FIG. 5 in which the focusing position is obtained in the first scan of the movable mirror and the position of the taking lens is controlled in the second scan of the movable mirror, the light beam is required to be projected on the object only in the first scan.

Upon initial stage of depression of the shutter release button, the power switch is turned ON and upon half depression of the shutter release button the light beam projecting device is operated to project a light spot on the object. Immediately thereafter, the auto-focusing device starts the first scanning by the movable mirror. During the first scanning, the light beam is projected onto the object. Simultaneously with the completion of the first scan, the light beam projection is terminated and the auto-focusing device starts the second scanning by the movable mirror. By the completion of the second scanning, the focus position is detected and the position of the taking lens is determined. (The lens barrel may be moved simultaneously with the second scanning so that the lens barrel may be stopped by detection of the focus position indicating signal.) In this embodiment, since the information regarding the focus position is displayed in the viewfinder in the state where the auto-focusing device has completed its operation to detect the focus position, the lens barrel is held in its waiting position and the result of the second scanning or focus position detection can be confirmed in the viewfinder as an electrical or mechanical signal by holding the shutter release button in the half-depressed position.

Then, by depressing the shutter release button further, the lens barrel is moved from the waiting position to the focus position. In response to completion of the movement of the lens barrel, the shutter is released to take a photograph.

As described hereinabove, the present invention is characterized in that the light beam projecting device is organically combined with the operation of the auto-focusing device or the shutter release button so that the operation of the light beam projecting device is controlled to continue for the minimum time, whereby the power consumption and the unnecessary offence to the model is prevented. Further, as mentioned hereinbefore, in a preferred embodiment of this invention, the light beam projecting device is combined with the power switch for the electronic flash light device so that the light beam projecting device may be automatically driven in case of using the flash light without manually turning on the switch of the light beam projecting device. Further, by combining the brightness measuring means with the light beam projecting device as shown in the preferred embodiment, the projection of the light beam on the object in case that the brightness is insufficient can be automatically prevented.

Figure 7:
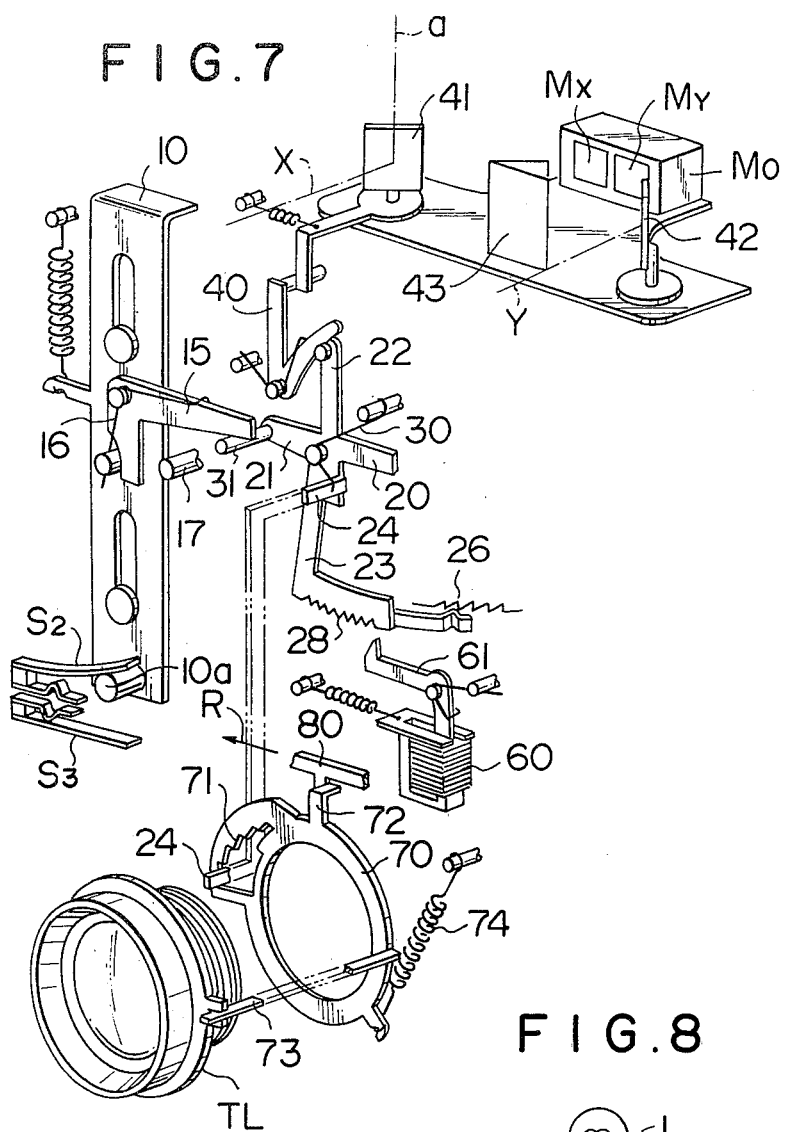
FIG. 7 is a perspective view showing an example the camera structure used in combination with this invention.

Now the present invention will be described in further detail referring to FIGS. 7 and 8. In FIG. 7, a detailed camera structure is illustrated in which the light projecting device of this invention is employed.

The upper right part of FIG. 7 shows the optical device for measuring distance corresponding to the device as shown in FIG. 5, in which elements 41, 42 and 43 correspond to elements 11a, 11b and 12 in FIG. 5, respectively. The reference numeral 10 designates a shutter release lever, 20 designates a potentio-lever and 70 shows a cam ring to axially move a taking lens TL.

Figure 8:
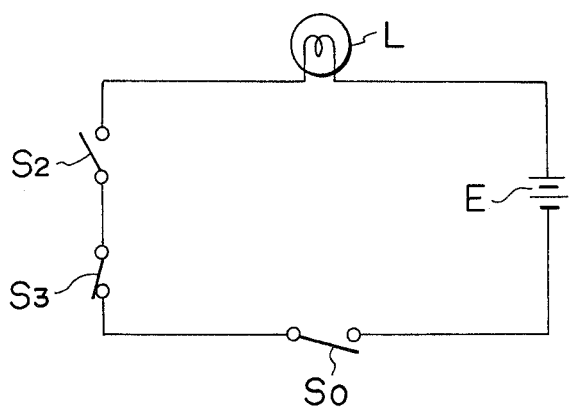
FIG. 8 shows a circuit to be used in the camera as shown in FIG. 7.

Referring to FIG. 8, a power switch S0 and switches S2 and S3 are connected in series with a lamp L and a power source E. The switches S0 and S2 correspond to those shown in FIGS. 3 and 4. Switch S3 is a lamp turn-OFF switch connected in series with the lamp turn-ON switch S2 and located at the lower end of the shutter release button 10 as shown in FIG. 7.

Now the operation and structure of the camera mechanism will be described in detail referring to FIG. 7. When the shutter release lever 10 is depressed, a camera power switch (not shown) is first turned on. This switch may be replaced by switch S2. Then, at the first stage, after the switch S2 is turned ON by the downward movement of a pin 10a fixed to the shutter release lever 10, a potentio-lever 20 is rotated counter-clockwise by the action of an actuating lever 15 mounted on the shutter release lever 10. A spring force of a spring 16 acting upon lever 15 is stronger than that of the spring 30 acting upon the potentio-lever 20. The actuating lever 15 presses a pin 31 fixed to the potentio-lever 20 downward when the shutter release lever 10 is depressed. The potentio-lever 20 has a first arm 21 having said pin 31, a second arm 22 having a pin slidably engaged with a V-shaped lever 40 for rotating a scanning mirror 41, and a third arm 23 having a serrated side edge 28 and a slidable electric contact to slide on a potentio-meter 26. Further, the potentio-lever 20 has a pin 24 to be engaged with a step of a stepwise cam 71 fixed to a cam ring 70 to axially move the taking lens TL by means of an engaging pin 73 which is spring biased counterclockwise by a tension spring 74 and stopped of its rotation by a stopper 80.

A lock lever 61 actuated by an electromagnet 60 is provided to lock the potentio-lever 20 by engagement with the serrated side edge 28 thereof.

As the potentio-lever 20 rotates counterclockwise, the second arm 22 moves the V-shaped lever 40 counterclockwise and the mirror 41 is rotated clockwise about axis a to conduct search scan. During the search scan, an AF (automatic focusing) module Mo searches for a focusing point by comparing the image from the rotatable mirror 41 with the image from a fixed mirror 42. For instance, the photoelectric output of the photosensor Mx receiving the light from the rotatable mirror 41 is compared with that of the photosensor My receiving the light from the fixed mirror 42 and the position where the difference therebetween is minimum is detected. The angular position of the potentio-lever 20 is converted to an electric signal by means of the potentio-meter 26. The position of the potentio-lever 20 where the output of the module Mo becomes maximum is determined only by the search scan and memorized.

Thus, the search scan is completed and the focusing position is detected. At this stage, if the shutter release lever 10 is released to move upward, the camera switch (not shown) is turned off and the memory of the focusing position is cancelled and prepared for memorizing fresh information. Further, while the release lever 10 is kept in its depressed position, the memorized focusing position is maintained in the memory.

Since the switch S2 is normally opened and the switch S3 is normally closed as shown in FIG. 8, when the shutter release lever 10 is depressed and the pin 10a allows the switch S2 to be closed, the lamp L is turned ON and the light beam is projected onto the subject matter to be photographed. Therefore, during the above described operation, the lamp L is turned ON to illuminate the subject matter for enhancing the sensitivity of distance measurement.

Then, as the shutter release lever 10 is depressed further downward, the pin 10a opens the switch S3 to turn OFF the lamp L. With the downward movement of the shutter release lever 10, the actuating lever 15 is moved counterclockwise by a fixed pin 17. Accordingly, the potentio-lever 20 starts to rotate clockwise. At the same time, the scanning rotatable mirror 41 is rotated counterclockwise to conduct detect scan. In this embodiment, the detect scan is not necessary and the mirror 41 is only mechanically returned to its initial position. In the course of the clockwise rotation of the potentio-lever 20, the electromagnet 60 operates to cause the lock lever 61 to engage the serrated side edge 28 of the third arm 23 of the lever 20 when the lever 20 comes to the position where the signal given by the potentio-meter 26 indicates the memorized position. Thus, the potentio-lever 20 is locked at the memorized position. The movable mirror 41 is also locked at the position. Accordingly, the pin 24 of the potentio-lever 20 is also locked at the detected position. Thus, the distance detection or measurement is completed.

Then, by further depressing the release lever 10 downward, a mechanical lock (not shown) is released to retract the stopper 80 from the stopping position in the direction of the arrow R to allow the cam ring 70 to rotate counterclockwise by means of the spring 74. The cam ring 70 is rotated counterclockwise up to the position where the stepwise cam 71 comes to the pin 24. Thus, the lens TL is moved axially up to the best focusing position.

Thereafter, the shutter is released to expose the film in the camera.

As will be noted from the circuit shown in FIG. 8, the lamp L is not turned ON when the lamp power switch S0 is turned off. Therefore, by connecting the lamp power switch S0 with an electronic flash light switch (not shown), it is possible to make the lamp L turned on whenever the scene brightness is so low as to need the flash light.

I claim:

1. A light beam projecting device for an auto-focusing camera provided with an auto-focusing device which comprises a first reflecting means including a fixed mirror for reflecting light from an object toward a first photoreceptor, and a second reflecting means including a movable mirror for reflecting light from the object toward a second photoreceptor, said movable mirror being rotated upon depression of a shutter release button in first and then second scan directions, in which in the first scan of the movable mirror the best focus position is automatically obtained, and in the second scan thereof the taking lens of the camera is automatically brought to the best focus position, said light beam projecting device having a light source which projects a light beam on the object to be photographed when the brightness of the object is not enough for the auto-focusing device to normally operate wherein the improvement comprises means for turning on the light source of said light beam projecting device only during the first scan of the movable mirror upon depression of the shutter release button.

2. A light beam projecting device as defined in claim 1 further comprising means for turning off the light source upon further depression of the shutter release button.

3. A light beam projecting device as defined in claim 1 wherein the light source of the light beam projecting device is located close to the taking lens of the camera and the optical axis of the light source is in parallel to the optical axis of the taking lens.

4. A light beam projecting device as defined in claim 1 wherein the spectral distribution of the light emitted by the light beam projecting device corresponds to the spectral sensitivity of the photosensor of the auto-focusing device.

5. A light beam projecting device as defined in claim 1 wherein said light beam has a patterned cross section.

* * * * *